United States Patent [19]

Collette

[11] Patent Number: 4,488,863
[45] Date of Patent: Dec. 18, 1984

[54] RECYCLING OF BLOW AIR

[75] Inventor: Wayne N. Collette, Canton, Conn.

[73] Assignee: The Continental Group, Inc., Stamford, Conn.

[21] Appl. No.: 236,959

[22] Filed: Feb. 23, 1981

[51] Int. Cl.³ .............................................. B29C 17/07
[52] U.S. Cl. ..................................... 425/530; 264/37; 264/526; 264/529; 264/530
[58] Field of Search .............. 264/523, 526, 528, 529, 264/530, 547, 37; 425/522, 530; 417/302, 303

[56] References Cited

U.S. PATENT DOCUMENTS

| | | |
|---|---|---|
| 2,345,082 | 3/1944 | Waseige . |
| 3,065,501 | 11/1962 | Gasmire ........................ 264/526 X |
| 3,496,879 | 2/1970 | Brandes . |
| 3,685,925 | 8/1972 | McJones ........................... 417/302 |
| 4,019,849 | 4/1977 | Farrell ................. 425/445 |
| 4,151,250 | 4/1979 | Barry et al. .................... 264/529 X |

FOREIGN PATENT DOCUMENTS 1600585  9/1970  France ............................ 264/529

*Primary Examiner*—Jan Silbaugh
*Attorney, Agent, or Firm*—Charles E. Brown

[57] ABSTRACT

This relates to the supplying of blow molding gas to a blow molding system. Most particularly, this relates to a blow molding gas supply which includes a low pressure supply and a high pressure supply and wherein the high pressure blowing gas of the molding operation is used to replenish the low pressure supply, thereby eliminating the presently required separate outside supply.

4 Claims, 3 Drawing Figures

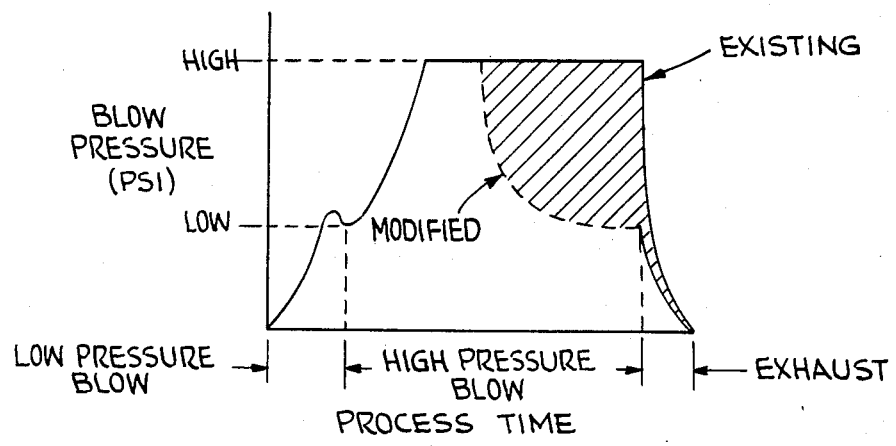
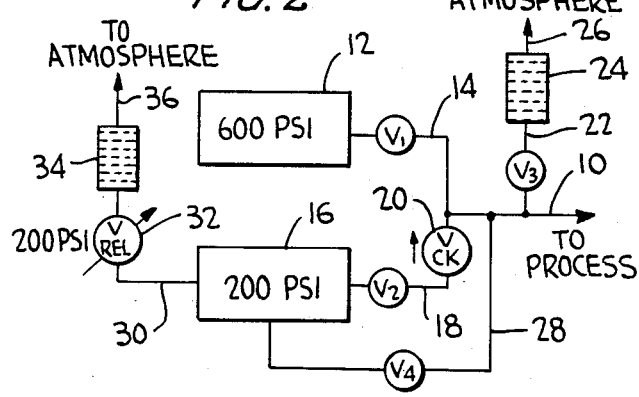 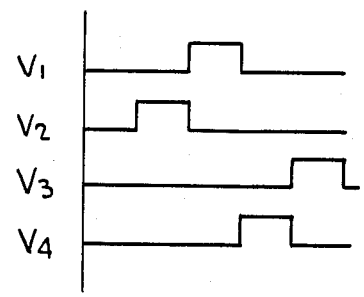

RECYCLING OF BLOW AIR

This invention relates in general to blow molding systems, and more particularly to the provision of the required blowing gas or air for a blow molding system.

At the present, certain articles, particularly beverage bottles, are blow molded in two blowing stage operations wherein a blowing gas is delivered to the preform at a pressure on the order of 200 p.s.i. After an initial stretching of the preform, both axially and radially, the blow molding of the article is completed by the introduction of blowing gas at a pressure on the order of 600 p.s.i. After the blowing operation has been completed, the blowing gas is then vented to atmosphere. The result is that all of the blowing gas pressure is lost.

In accordance with this invention, it is proposed to make the low pressure blowing gas supply self-sustaining by coupling the blown article to the low pressure supply during an initial part of the exhausting and then completing the exhausting of the blowing gas at pressures equal to and lower than the low pressure.

In accordance with this invention, piping to a blow molding operation is separately connected to a low pressure supply by two flow lines incorporating two separate flow valves. One of the valves is opened to initiate a blowing operation and is then closed. The other valve, which is normally closed, is opened only after the blowing operation has been completed and is held open for only a limited period of time sufficient to permit high pressure blowing gas to be directed into the low pressure supply. Inasmuch as the volume of gas available at the termination of a blowing operation wherein the gas is at a pressure in excess of the pressure of the low pressure supply is greater than the volume of the gas expended during the initial low pressure blowing operation, there is always an excess of replenishing gas so that the low pressure supply is self-sustaining.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a graph plotting blowing pressure against process time, and shows the volumes of gas involved including the volume of gas available for low pressure supply replenishment.

FIG. 2 is a schematic view showing the blowing gas system of this invention.

FIG. 3 is a graph showing the timing sequence of the opening and closing of the valves of the system.

In accordance with this invention, there is provided piping 10 which leads to a blow molding apparatus for introducing blowing gas to the blow molding apparatus and for exhausting such blowing gas at the end of a blow molding cycle. There is provided a high pressure blowing gas supply 12 which is maintained preferably by an air compressor (not shown) at a pressure on the order of 600 p.s.i. The high pressure supply 12 is connected by piping 14 to the piping 10 and has incorporated therein a flow control valve $V_1$. The valve $V_1$ is normally closed.

There is also provided a low pressure blowing gas supply 16 wherein the low pressure blowing gas is maintained at a pressure on the order of 200 p.s.i. Piping 18 connects the low pressure supply 16 to the piping 10 and has incorporated therein a flow control valve $V_2$. The valve $V_2$ is also normally closed. The piping 18 also has incorporated therein between the valve $V_2$ and the piping 10 a one-way or check valve 20.

Further piping 22 couples the piping 10 to a muffler 24 and an exhaust line 26. The piping 22 has incorporated therein a normally closed flow valve $V_3$.

The system as described, except for means for maintaining the low pressure supply, is conventional and represents the prior art. In a blow molding operation, the valve $V_2$ is first opened to supply to the piping 10 blowing gas at low pressure. After a predetermined time delay, the valve $V_2$ is closed and the valve $V_1$ is opened to permit the introduction of high pressure gas to the piping 10 so as to complete the blow molding operation. After a suitable delay, the valve $V_1$ is closed and the valve $V_3$ is opened to exhaust all of the blowing gas to atmosphere.

In accordance with this invention, the previously required means for maintaining the low pressure blowing gas supply is eliminated. Instead, there is provided a return line 28 between the piping 10 and the low pressure supply 16. The return line 28 has incorporated therein a flow control valve $V_4$.

In accordance with this invention, after the blow molding operation has been completed, instead of opening the flow control valve $V_3$, the flow control valve $V_4$ is first opened so as to exhaust high pressure blowing gas, i.e. blowing gas at a pressure in excess of the pressure of the low pressure supply, at the low pressure supply 16, thereby replenishing the same. As the pressure within the piping 10 approaches the pressure of the low pressure supply 16, the valve $V_4$ closes and the valve $V_3$ opens to vent the remaining gas to atmosphere.

In order to maintain the maximum pressure of the low pressure blowing gas supply, there is coupled to the low pressure supply 16 a pressure relief line 30 having incorporated therein a relief valve 32 which may be of the variable pressure type. The line 30 leads to a muffler 34 which, in turn, is connected to an exhaust line 36. Thus, while the low pressure supply 16 may be replenished by gas at a pressure in excess of the set pressure of the low pressure supply, at the end of each blowing operation the pressure of the available blowing gas in the low pressure supply is always at the preset maximum.

Referring now to FIG. 3, it will be seen that the valves are operated by a suitable automatic control device (not shown) so that the valve $V_2$ first opens and then, as it closes, the valve $V_1$ opens. In the event there should be any overlap between the opening of the valves $V_1$ and $V_2$, backflow through the line 18 is prevented by the check or one-way valve 20.

After the blowing operation has been completed and the valve $V_1$ is closed, the valve $V_4$ is opened to replenish the low pressure supply 16. While the timing of the closing of the valve $V_4$ should be such that there will be no overlap, it will be seen that there will be no damaging results if there is a slight overlap, only an undue loss of blowing gas at high pressure.

After the valve $V_4$ closes, the valve $V_3$ is opened to complete the exhausting of the blowing gas.

Reference is now made to FIG. 1 wherein the blowing pressures involved in a conventional beverage bottle blowing operation are plotted against process time. It will be seen that in accordance with the blowing gas supply operation prior to this invention the piping 10 was opened directly to atmosphere and there was a sudden loss of all of the blowing gas under pressure to atmosphere. However, in accordance with this invention, when the replenishing line 28 and the valve $V_4$ are provided, a large amount of the high pressure blowing gas, more than that required to replenish the low pressure supply 16, is directed to the low pressure supply 16. This gas is generally diagrammatically illustrated in the graph of FIG. 1 by the cross-hatching in the upper right-hand corner of the graph.

Although only a preferred embodiment of the invention has been specifically illustrated and described herein, it is to be understood that minor variations may be made in the blow molding gas supply system without departing from the spirit and scope of the invention as defined by the appended claims.

I claim:

1. In combination with a system for blowing articles in two different pressure stages, a blowing gas supply system, said blowing gas supply system comprising a high pressure gas supply and a separate low pressure gas supply, piping leading to a blow molding apparatus, first valve means coupling said low pressure gas supply to said piping for delivering low pressure blowing gas to said piping, second valve means connecting said high pressure gas supply to said piping for delivering high pressure blowing gas to said piping, and third valve means connecting said low pressure gas supply to said piping for returning high pressure gas from said piping to said low pressure gas supply for reclaiming high pressure blowing gas for use as said low pressure blowing gas.

2. A system according to claim 1 together with a one-way valve between said first valve and said piping for preventing flow of high pressure blow gas to said low pressure gas supply through said first valve.

3. A system according to claim 1 together with a pressure relief valve coupled to said low pressure gas supply for limiting the pressure of blowing gas therein.

4. A system according to claim 1 together with a fourth valve for coupling said piping to vent to exhaust low pressure blowing gas.

* * * * *